(12) United States Patent
Verma et al.

(10) Patent No.: US 12,315,898 B2
(45) Date of Patent: May 27, 2025

(54) SYSTEM FOR EXTRACTING ELECTRODE MATERIAL FROM BATTERIES

(71) Applicant: LOHUM CLEANTECH PRIVATE LIMITED, Delhi (IN)

(72) Inventors: Rajat Verma, Delhi (IN); Syed Gazanfar Abbas Safvi, Greater Noida (IN); Vikrant Singh, Kannauj (IN)

(73) Assignee: LOHUM CLEANTECH PRIVATE LIMITED, Delhi (IN)

( * ) Notice: Subject to any disclaimer, the term of this patent is extended or adjusted under 35 U.S.C. 154(b) by 541 days.

(21) Appl. No.: 17/799,105

(22) PCT Filed: Feb. 12, 2021

(86) PCT No.: PCT/IB2021/051176
§ 371 (c)(1),
(2) Date: Aug. 11, 2022

(87) PCT Pub. No.: WO2021/161240
PCT Pub. Date: Aug. 19, 2021

(65) Prior Publication Data
US 2023/0076830 A1   Mar. 9, 2023

(30) Foreign Application Priority Data
Feb. 12, 2020 (IN) .............................. 202011006138

(51) Int. Cl.
*H01M 10/54* (2006.01)
*B03C 1/30* (2006.01)
(Continued)

(52) U.S. Cl.
CPC ............. *H01M 10/54* (2013.01); *B03C 1/30* (2013.01); *B09B 3/35* (2022.01); *B09B 3/40* (2022.01);
(Continued)

(58) Field of Classification Search
CPC ...... Y02W 30/52; Y02W 30/84; B02C 23/10; B02C 19/186; Y02P 10/20; B09B 2101/16; H01M 10/54
See application file for complete search history.

(56) References Cited

U.S. PATENT DOCUMENTS

| 7,192,564 B2 * | 3/2007 | Cardarelli | H01M 6/52 75/693 |
| 7,820,317 B2 * | 10/2010 | Tedjar | C22B 7/006 429/49 |
| 8,882,007 B1 * | 11/2014 | Smith | H01M 10/54 241/23 |

FOREIGN PATENT DOCUMENTS

| CA | 2559928 A1 | 10/2005 |
| CN | 102615095 A | 8/2012 |

(Continued)

OTHER PUBLICATIONS

Translation of CN-110479478.*

(Continued)

*Primary Examiner* — Bobby Yeonjin Kim
(74) *Attorney, Agent, or Firm* — Haukaas Fortius PLLC; Michael Haukaas; Paul K. Judd

(57) ABSTRACT

The present disclosure relates to a system (100) for extracting electrode material from batteries. A shredding unit (104) configured to receive the cooled feedstock from the freezing unit (102). The shredding unit (104) is configured to shred the feedstock into powder form. A cyclone separator (110) configured with the shredding unit (104), and configured to receive air bone electrode material particles generated as a result of shredding the batteries. A separating unit (106) configured with the shredding unit (104), and configured to separate the electrode material particles. A cleaning unit (108) operatively configured with the separating unit and the cyclone separator (110). The cleaning unit (108) is config- (Continued)

ured to receive the powdered electrode particles from the shredding unit (104), and powdered electrode materials from a first output of the cyclone separator (110). A mixing agitator (110) is configured to receive the powdered electrode material from the cleaning unit (108).

9 Claims, 2 Drawing Sheets

(51) Int. Cl.
  *B09B 3/35* (2022.01)
  *B09B 3/40* (2022.01)
  *B09B 101/16* (2022.01)
  *C22B 7/00* (2006.01)
  *B03B 9/06* (2006.01)
(52) U.S. Cl.
  CPC ........ *C22B 7/005* (2013.01); *B03B 2009/066* (2013.01); *B03C 2201/20* (2013.01); *B09B 2101/16* (2022.01)

(56) References Cited

FOREIGN PATENT DOCUMENTS

| CN | 107008729 | A |   | 8/2017  |           |
|----|-----------|---|---|---------|-----------|
| CN | 208800245 | U | * | 4/2019  | ............ B02C 21/00 |
| CN | 109868364 | A | * | 6/2019  |           |
| CN | 110479478 | A | * | 11/2019 |           |
| WO | 2017118955| A1|   | 7/2017  |           |

OTHER PUBLICATIONS

Translation of CN-109868364.*
Translation of CN-208800245.*
International Search Report and Written Opinion of the ISA/IN dated Jun. 10, 2021 in International Application No. PCT/IB2021/051176; 7pgs.

* cited by examiner

SYSTEM FOR EXTRACTING ELECTRODE MATERIAL FROM BATTERIES

RELATED APPLICATIONS

This application is a national stage application filed under 35 U.S.C. § 371 of International Application No. PCT/IB2021/051176 filed Feb. 12, 2021, which claims the benefit of Indian Patent Application number 202011006138 filed Feb. 12, 2020, which applications are incorporated herein by reference in their entirety.

TECHNICAL FIELD

The present disclosure relates to the field of electrode materials in batteries. More particularly the present disclosure relates to extraction of electrode materials from the used batteries.

BACKGROUND

Background description includes information that may be useful in understanding the present invention. It is not an admission that any of the information provided herein is prior art or relevant to the presently claimed invention, or that any publication specifically or implicitly referenced is prior art.

Lithium batteries application is widely used in various household and commercial application such as uninterruptible power supply (UPS) mobile backups, mobile, electric mobility, energy grid storage systems etc. After use, most of these batteries are simply discarded and find their way to landfill sites. Therefore, it is necessary to recycle such battery for environment as well as for effective resource utilization. In addition, recycling industry to meet international and domestic advanced level of clean production enterprises must adopt automatic crushing system and mechanical crushing for separation of cathode and anode materials with higher separation rate.

Therefore, there is a requirement of an improved recycling system and method to extract electrode material from the used batteries.

OBJECTS OF THE PRESENT DISCLOSURE

Some of the objects of the present disclosure, which at least one embodiment herein satisfies are as listed herein below.

It is an object of the present disclosure to provide a system for extracting electrode material from used batteries.

It is an object of the present disclosure to provide a system for extracting electrode material from used batteries which is easy to use.

It is an object of the present disclosure to provide a system for extracting electrode material from used batteries which is cost effective.

It is an object of the present disclosure to provide a system for extracting electrode material from used batteries which requires less maintenance cost.

It is an object of the present disclosure to provide a system for extracting electrode material from used batteries without any human intervention

SUMMARY

The present disclosure relates to the field of electrode materials in batteries. More particularly the present disclosure relates to extraction of electrode materials from the used batteries.

An aspect of the present disclosure pertains to a system for extracting electrode material from one or more batteries. The system includes a freezing unit configured to receive a feedstock of the one or more batteries. The feedstock may be cooled at a pre-defined temperature in the freezing unit. A shredding unit configured to receive the cooled feedstock from the freezing unit. The shredding unit is configured to shred the feedstock into powder form. A cyclone separator configured with the shredding unit, and configured to receive air bone electrode material particles generated as a result of shredding the one or more batteries. A separating unit configured with the shredding unit, and configured to separate the electrode material particles. A cleaning unit operatively configured with the separating unit and the cyclone separator. The cleaning unit is configured to receive the powdered electrode particles from the shredding unit, and powdered electrode materials from a first output of the cyclone separator. The powdered electrode material is treated with a fluid in the cleaning unit, and clean electrode material is extracted as an output of the cleaning unit.

In an aspect, the shredding unit may include any or combination of one or more shredders, and one or more impact crushers. The separating unit may include any or combination of a powder separating unit configured with the shredding unit, and a magnetic material separating unit, facilitating separating of magnetic material particles from the electrode material particles, configured with the powder separating unit. The cleaning unit may include any or combination of a first mixing tank, and wet screener, and a second mixing tank. The first mixing tank may be configured with, to receive the electrode material, the separating unit, the wet screener may be configured with the first mixing tank to receive the electrode material, and the second mixing tank may be configured with, to receive cleaned electrode material, the wet screener, and the second mixing tank may be configured to provide the electrode material as output.

In an aspect, a second output of the cyclone separator may be configured with, to transfer a mixture of vaporized electrolyte and air, a furnace. The mixture of vaporized electrolyte and air may be mixed with an inflammable material in the furnace to burn the mixture. The furnace may be configured with, through a chimney, an air treatment unit to remove harmful gases from exhaust gases of the furnace. The air treatment unit may include any or combination of a caustic scrubber, one or more filters, and caustic solution chamber. The exhaust gases are treated with a calcium compound in the air treatment unit, to clean the released gases before releasing to the atmosphere, in the air treatment unit. The system may include a conveyor system for inputting the batteries to the freezing unit.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
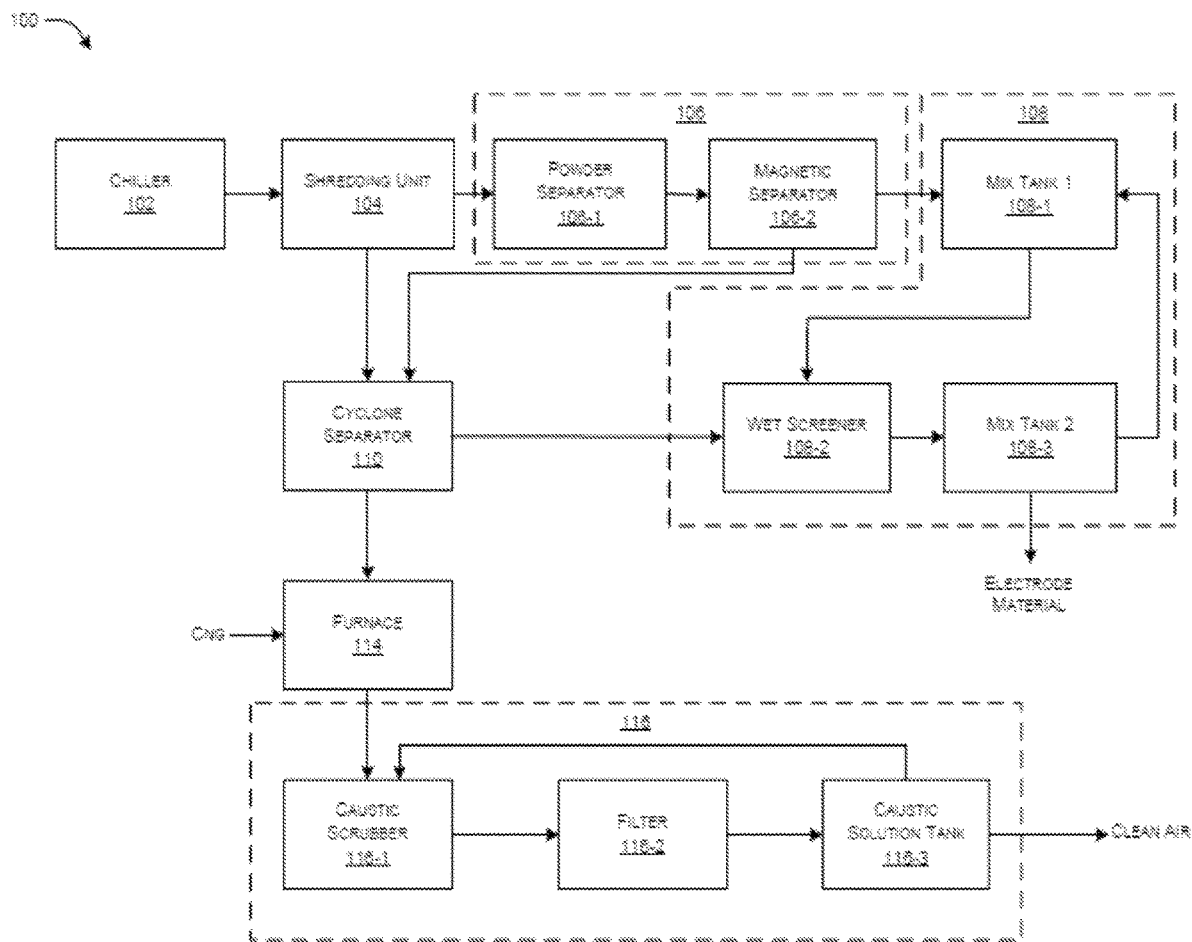
FIG. 1 illustrates an exemplary block diagram of a system for extracting electrode material from battery, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

The present disclosure relates to the field of electrode materials in batteries. More particularly the present disclosure relates to extraction of electrode materials from the used batteries.

The present disclosure elaborates upon to a system for extracting electrode material from one or more batteries. The system includes a freezing unit configured to receive a feedstock of the one or more batteries. The feedstock may be cooled at a pre-defined temperature in the freezing unit. A shredding unit configured to receive the cooled feedstock from the freezing unit. The shredding unit is configured to shred the feedstock into powder form. A cyclone separator configured with the shredding unit, and configured to receive air bone electrode material particles generated as a result of shredding the one or more batteries. A separating unit configured with the shredding unit, and configured to separate the electrode material particles. A cleaning unit operatively configured with the separating unit and the cyclone separator. The cleaning unit is configured to receive the powdered electrode particles from the shredding unit, and powdered electrode materials from a first output of the cyclone separator. The powdered electrode material is treated with a fluid in the cleaning unit and the electrode material is extracted as an output from the cleaning unit.

In an embodiment, the shredding unit can include any or combination of one or more shredders, and one or more impact crushers.

In an embodiment, the separating unit can include any or combination of a powder separating unit configured with the shredding unit, and a magnetic material separating unit, facilitating separating of magnetic material particles from the electrode material particles, configured with the powder separating unit.

In an embodiment, the cleaning unit can include any or combination of a first mixing tank, and wet screener, and a second mixing tank. The first mixing tank can be configured with, to receive the electrode material, the separating unit, the wet screener can be configured with the first mixing tank to receive the electrode material, and the second mixing tank can be configured with, to receive cleaned electrode material, the wet screener, and the second mixing tank can be configured with, to transfer the electrode material, the mixing agitator.

In an embodiment, a second output of the cyclone separator can be configured with, to transfer a mixture of vaporized electrolyte and air, a furnace.

In an embodiment, the mixture of vaporized electrolyte and air can be mixed with an inflammable material in the furnace to burn the mixture.

In an embodiment, the furnace can be configured with, through a chimney, an air treatment unit to remove harmful gases from exhaust gases of the furnace.

In an embodiment, the air treatment unit can include any or combination of a caustic scrubber, one or more filters, and caustic solution chamber. The exhaust gases are treated with a calcium compound in the air treatment unit, to clean the released gases before releasing to the atmosphere, in the air treatment unit.

In an embodiment, the system can include a conveyor system for inputting the batteries to the freezing unit.

FIG. 1 illustrates an exemplary block diagram of a system for extracting electrode material from battery, in accordance with an embodiment of the present disclosure.

Figure 2:
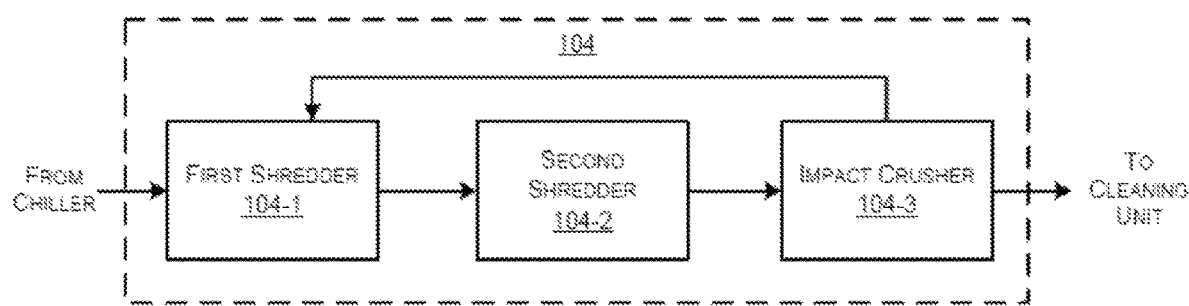
FIG. 2 illustrates an exemplary block diagram of shredding unit in the system for extracting electrode material from battery, in accordance with an embodiment of the present disclosure.

FIG. 2 illustrates an exemplary block diagram of shredding unit in the system for extracting electrode material from battery, in accordance with an embodiment of the present disclosure.

The present disclosure related to a method or system of extracting anode and cathode electrode materials from the spent or used batteries such as lithium batteries. The batteries may include at least one negative electrode active material (also known as cathode), a separator, an electrolyte, one positive electrode active material (also known as anode), a current collector, and a cell casing.

In an exemplary embodiment, an anode may be a dispersion of zinc oxide powder in a gel containing a potassium hydroxide electrolyte. The anode may be surrounded by a separator which may be a layer of cellulose (paper) or a synthetic polymer (plastic). Surrounding the separator may be an annular cathode which may be a compressed paste of manganese dioxide with carbon (graphite) powder to increase conductivity. The anode, separator, and cathode may be sealed in a drawn steel casing. In the process of recycling, the casing may be dismantled. After the dismantling of the casing, electric hardware may be passed through one or more refining processes such as but not limited to crushing, sorting the metal and its derivative etc. in order to retrieve metal such as Lithium (Li) and their derivative such as Li-polymer.

As illustrated, refining process of the battery such as crushing can be performed on the one or more used batteries to form a feedstock of one or more batteries that can transferred using a conveyor system (not shown) to a freezing unit 102. The conveyor system can be operated at variable speed that can be but not limited to 4.2 to 10 meter per minute. The freezing unit 102 can include but not limited to a fridge, a chiller, or like. The one or more batteries can be cooled at a pre-defined temperature (approximately −10 deg.) in the freezing unit 102 to avoid catching fire by the batteries while shredding them. A shredding unit 104 can be configured to receive the cooled batteries from the freezing unit 102. The shredding unit 104 can be configured to shred the one or more batteries into powder form. The shredding unit can include any or combination of but not limited to a first shredder that can be configured to receive the cooled batteries from the freezing unit 102.

In an embodiment, the feedstock can take 15 s-30 s to get transfer from the freezing unit 102 to the first shredder 104-1. This can result in reduction in ionic mobility, thereby achieving better shredding. The first shredder 104-1 can be operated at constant speed. In an exemplary embodiment, speed of the first shredder 104-1 can be approximately 20-35 rotation per minute (rpm). In another exemplary embodiment, blades length and width of the first shredder 104-1 can be approximately 3 inches and 0.31 inches, respectively. The first shredder can shred the feedstock into pieces that can be of size approximately 0.5 inches to 0.3 inches in length. After passing through the first shredder 104-1, the shredded material can be passed through the second shredder 104-2. A speed of the second shredder 104-2 can be approximately 25-50 rpm. With the shredding at the second shredder 104-2, a size of shredded pieces can become 0.2-0.4 inches. The shredder material than can be passed through an impact crusher 104-3 that can be configured to convert the shredded material into powder form.

In an embodiment, a cyclone separator 110 can be configured with the shredding unit 104, and configured to receive air bone electrode material particles generated as a result of shredding the one or more batteries. The cyclone separator can include centrifugal blades that can keep on rotating. The cyclone separator can be configured to receive air bone electrode material particles that can be collected by using the centrifugal blades. A separating unit 106 can be configured with the shredding unit 104, and can be configured to separate the electrode material particles. The separating unit 106 can include but not limited to a powder separating unit 106-1 that can be configured to separate electrode material powder from rest of powder. A magnetic separating unit 106-2 that can be configure to receive output of the powder separating material 104-1, and can be configure to separate magnetic material from the electrode material powder particles. The magnetic separating unit 106-2 comprise a magnetic drum of size 6 inches (diameter)×10 inches and magnetic power of the magnetic separating unit 106-2 can be 3000 Gauss+10%. The magnetic separator 106-2 can be configured with the cyclone separator such that any electrode particles escaped from the magnetic separator 106-2 are received by the cyclone separator 110.

In an embodiment, a cleaning unit 108 can be operatively configured with the separating unit 106 and the cyclone separator 110. The cleaning unit 108 can be configured to receive the powdered electrode particles from the shredding unit 104, and powdered electrode materials from a first output of the cyclone separator 110. The powdered electrode material can be treated with a fluid in the cleaning unit 108. The fluid can be any or combination of but not limited to water, and acid. The cleaning unit 108 can include but not limited to a first mixing tank 108-1, wet screener 108-2, and a second mixing tank 108-3. The first mixing tank 108-1 can be configured with the separating unit 106 to receive the electrode material. The first mixing tank 108-1 and the second mixing tank 108-3 can include in-built agitators to prevent electrode materials from choking pumps. The first mixing tank can be made of stainless steel and can receive non-magnetic electrode powder from the magnetic separator 106-2. Some plastic/copper foil/aluminum foil which is non-magnetic can also be present in an output of the first mixing tank 108-1. Water can be pumped into the first mixing tank so that the electrode powder can become a slurry. This slurry can be released onto the wet screener 108-2 to separate out any particles of plastic/copper/aluminum that may have escaped separation at the powder separation stage 106-1.

In an embodiment, wet screener 108-2 can be configured with the first mixing tank 108-1 to receive the electrode material. The wet screener (or wet screen) can separate any large particles of plastic, copper or aluminum that may have escaped separation at the powder separator stage. The second mixing tank 108-3 can be configured with, to receive cleaned electrode material, the wet screener 108-2, and electrode material can be extracted as an output of the second mixing tank 108-3. A mixing tank 112 can have acidic solution and can be configured with the wet screener 108-2, and configured to receive the powdered electrode material from the wet screener 108-2, and the electrode material is extracted from an output of the mixing agitator 112. The wet screener 108-2 can include but not limited to a wet vibrating screen. The mixing agitator 112 can include an agitator that can be configured to be rotated at a variable speed. The mixing tank can be made of stainless steel to prevent corrosion by any acid that may be put into the system to clean/leach the electrode powder mix. Hence, it mixes the reagents prior to their being pumped into the equipment used for the next steps of the process. The second mixing tank 108-2 can be configured with the first mixing tank 108-1 so as to form a close loop for iterative cleaning of the electrode material.

In an embodiment, as a result of shredding the feedstock harmful toxic and flammable gases such as hydrogen and hydrofluoric gas (also referred as vaporized electrolyte, herein) can be evolved from electrolyte solution. The cyclone separator 110 can be configure to receive such gases and can be configured to pass them to a furnace 114 through a second output of the cyclone separator 110. The mixture of vaporized electrolyte and air can be mixed with an inflammable material in the furnace to burn the mixture. The inflammable material can include but not limited to liquefied petroleum gas (LPG), and compressed natural gas (CNG). The furnace 114 can be configured with, through a chimney, an air treatment unit 116 to remove harmful gases from exhaust gases of the furnace 114.

In an embodiment, the air treatment unit 116 can include but not limited to any or combination of a caustic scrubber 116-1, one or more filters 116-2, and caustic solution chamber 116-3. The exhaust gases are treated with in a caustic scrubber wherein harmful gases can react with calcium compound to form various benign compounds. The calcium compound can include but without limiting to hydrated lime, calcium carbonate, calcium sulphate, calcium fluoride. The calcium compound can deplete in potency over a period of time by forming inert compounds and can be replaced at predetermined intervals. etc. are formed which are inert. calcium compound in the air treatment unit, to clean the released gases before releasing to the atmosphere, in the treatment chamber. The caustic scrubber 116-1 can be configured to receive the exhaust gases from the furnace 114, and the exhaust gases can be treated with calcium compound that can be but not limited to calcium carbonate. The calcium compound can facilitate neutralizing the harmful components of the exhaust gases from the furnace. An output of the caustic scrubber 116-1 be inputted to a filter 116-2 and then to a caustic solution chamber 116-3 where the exhaust gases are again treated with the calcium compound to effectively clean the exhaust gases, before releasing them to the atmosphere.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The proposed invention provides a system for extracting electrode material from used batteries.

The proposed invention provides a system for extracting electrode material from used batteries which is easy to use.

The proposed invention provides a system for extracting electrode material from used batteries which is cost effective.

The proposed invention provides a system for extracting electrode material from used batteries which requires less maintenance cost.

The proposed invention provides a system for extracting electrode material from used batteries without any human intervention.

We claim:

1. A system (100) for extracting electrode material from one or more batteries, the system comprising:
    a freezing unit (102) configured to receive a feedstock of the one or more batteries, wherein the feedstock is cooled at a pre-defined temperature in the freezing unit;
    a shredding unit (104) configured to receive the cooled feedstock from the freezing unit (102), wherein the shredding unit (104) is configured to shred the feedstock in powder form;
    a cyclone separator (110) configured with the shredding unit (104), and configured to receive air bone electrode material particles generated as a result of shredding the one or more batteries;
    a separating unit (106) configured with the shredding unit (104), and configured to separate the electrode material particles;
    a cleaning unit (108) operatively configured with the separating unit (106) and the cyclone separator (110), wherein the cleaning unit (108) configured to receive the powdered electrode particles from the shredding unit (104), and powdered electrode materials from a first output of the cyclone separator (110), wherein the powdered electrode material is treated with a fluid in the cleaning unit (108); and wherein the electrode material is extracted as an output from the cleaning unit.

2. The system (100) as claimed in claim 1, wherein the shredding unit (104) comprises any or combination of one or more shredders (104-1 104-2), and one or more impact crushers (104-3).

3. The system (100) as claimed in claim 1, wherein the separating unit (106) comprises any or combination of a powder separating unit (106-1) configured with the shredding unit (104), and a magnetic material separating unit (106-2), facilitating separating of magnetic material particles from the electrode material particles, configured with the powder separating unit (106-2).

4. The system (100) as claimed in claim 1, the cleaning unit (108) comprises any or combination of a first mixing tank (108-1), and wet screener (108-2), and a second mixing tank (108-3), wherein the first mixing tank (108-1) is configured with, to receive the electrode material, the separating unit (106), the wet screener (108-2) is configured with the first mixing tank (108-1) to receive the electrode material, and the second mixing tank (108-3) is configured with, to receive cleaned electrode material, the wet screener (108-2), and the second mixing tank (108-3) is configured to provide the electrode material.

5. The system (100) as claimed in claim 1, wherein a second output of the cyclone separator (110) is configured with, to transfer a mixture of vaporized electrolyte and air, a furnace (114).

6. The system (100) as claimed in claim 4, wherein the mixture of vaporized electrolyte and air is mixed with an inflammable material in the furnace (114) to burn the mixture.

7. The system (100) as claimed in claim 5, wherein the furnace (114) is configured with, through a chimney, an air treatment unit to remove harmful gases from exhaust gases of the furnace (114).

8. The system (100) as claimed in claim 7, wherein the air treatment unit (116) comprises any or combination of a caustic scrubber (116-1), one or more filters (116-2), and caustic solution chamber (116-3), wherein the exhaust gases are treated with a calcium compound in the air treatment unit (116), to clean the released gases before releasing to the atmosphere, in the air treatment unit (116).

9. The system (100) as claimed in claim 1, wherein the system (100) comprises a conveyor system for inputting the batteries to the freezing unit (102).

* * * * *